United States Patent
Kaczynski (10) Patent No.: US 10,303,423 B1
(45) Date of Patent: May 28, 2019

(54) SYNCHRONOUS SAMPLING OF ANALOG SIGNALS

(71) Applicant: Second Sound LLC, Houston, TX (US)

(72) Inventor: Brian James Kaczynski, Cracow (PL)

(73) Assignee: Second Sound, LLC, Miami, FL (US)

( * ) Notice: Subject to any disclaimer, the term of this patent is extended or adjusted under 35 U.S.C. 154(b) by 588 days.

(21) Appl. No.: 14/864,899

(22) Filed: Sep. 25, 2015

(51) Int. Cl.
*G06F 17/00* (2019.01)
*G06F 3/16* (2006.01)
*G06F 1/12* (2006.01)
*G10H 5/00* (2006.01)

(52) U.S. Cl.
CPC ............ *G06F 3/165* (2013.01); *G06F 1/12* (2013.01); *G10H 5/002* (2013.01); *G10H 2250/641* (2013.01)

(58) Field of Classification Search
CPC .. G06F 3/165; G06F 1/12; G06F 1/04; G10H 5/002; G10H 2250/641
See application file for complete search history.

(56) References Cited

U.S. PATENT DOCUMENTS

| | | | | | |
|---|---|---|---|---|---|
| 5,202,528 | A | * | 4/1993 | Iwaooji | G10H 1/12 84/616 |
| 5,804,749 | A | * | 9/1998 | Shirakawa | G10H 7/002 84/601 |
| 7,003,120 | B1 | * | 2/2006 | Smith | G10H 1/20 381/103 |
| 2005/0120870 | A1 | * | 6/2005 | Ludwig | G10H 1/00 84/661 |
| 2011/0299704 | A1 | * | 12/2011 | Kaczynski | G10H 1/08 381/98 |

* cited by examiner

*Primary Examiner* — Fan S Tsang
*Assistant Examiner* — David Siegel
(74) *Attorney, Agent, or Firm* — Julia Kornilova; James Earl Lowe, Jr.

(57) ABSTRACT

Methods and systems including music synthesizers for synchronous sampling of analog signals are disclosed. A music synthesizer can include an adaptive low-pass filter, a synchronous sample clock generator, a digital signal processor, an analog-to-digital converter, and a digital-to-analog converter. The synchronous sample clock generator creates a synchronous sample clock signal using a filtered audio signal, as well as an "up" pulse and a "down" pulse, all of which are utilized by the digital signal processor to perform operations on the audio signal. The digital signal processor generates a clean sample clock for resampling the original audio signal to the synchronous sample clock rate.

20 Claims, 5 Drawing Sheets

FIG. 5

SYNCHRONOUS SAMPLING OF ANALOG SIGNALS

CROSS REFERENCE TO RELATED U.S. PATENT APPLICATIONS

The present application is related to U.S. patent application Ser. No. 14/864,886 entitled FAST-LOCKING FREQUENCY SYNTHESIZER, filed Sep. 25, 2015, which is incorporated herein by reference in its entirety for all purposes.

BACKGROUND

The present disclosure relates generally to signal sampling performed by music synthesizers. A music synthesizer is an electronic musical instrument that generates electric signals. The methods used by music synthesizers to generate the electric signals include additive synthesis, subtractive synthesis, sample-based synthesis, as well as other methods. An electronic filter is a music synthesizer component, and is often used in various synthesis methods, and in particular, in the subtractive synthesis method. The electronic filter may pass some frequency regions through unattenuated, while attenuating others. The electronic filter may be a low-pass filter, a band-pass filter, or a high-pass filter.

A popular technique called sample-based synthesis method involves recording a musical instrument as a digitized waveform, and then playing back the recordings at different pitches to produce different tones. The sample-based music synthesizers use digitally recorded sounds in place of oscillators.

Synchronous sampling of periodic or quasi-periodic signals has been traditionally used in engineering disciplines such as clock and data recovery circuits. However, usage of the synchronous sampling methods in the context of music synthesizers presents specific challenges.

SUMMARY

Implementations of the methods, systems, and apparatuses for sampling quasi-periodic analog signals are disclosed herein. One implementation is a method. The method includes receiving a first audio signal. The method further includes receiving a predetermined sampling rate. The method further includes determining a second audio signal by removing one or more frequencies from the first audio signal. The method further includes generating a synchronous sample clock signal based on the second audio signal. The method further includes converting the first audio signal into a first digital signal using the predetermined sampling rate. The method further includes generating a second digital signal using the first digital signal and the synchronous sample clock signal.

Another implementation is a music synthesizer providing synchronous clock sampling. The music synthesizer includes an adaptive low-pass filter configured to receive a first audio signal and generate a second audio signal using the first audio signal. The music synthesizer further includes a synchronous sample clock generator configured to generate a synchronous sample clock signal based on the second audio signal. The music synthesizer further includes an analog-to-digital converter configured to operate at a predetermined sample rate and receive the first audio signal, and generate a first digital output. The music synthesizer further includes a digital signal processor configured to receive the first digital data output and the synchronous sample clock signal, and generate a second digital data output. The music synthesizer further includes a digital-to-analog converter configured to receive the second digital output, operate at the predetermined sample rate, and generate a third audio signal.

Another implementation is a music synthesizer providing synchronous clock sampling. The music synthesizer includes an adaptive low-pass filter configured to receive a first audio signal and generate a second audio signal using the first audio signal. The first audio signal is a musical signal. The music synthesizer further includes a synchronous sample clock generator configured to generate a synchronous sample clock signal based on the second audio signal. The synchronous sample clock generator comprises a plurality of divide by two components, control logic, and a multiplexer. The music synthesizer further includes an analog-to-digital converter configured to operate at a predetermined sample rate and receive the first audio signal, and generate a first digital output. The music synthesizer further includes a digital signal processor configured to receive the first digital data output and the synchronous sample clock signal, and generate a second digital data output. The digital signal processor comprises a cycle counter, a first bank of flip-flops, a second bank of flip-flops, and a digital filter. The music synthesizer further includes a digital-to-analog converter configured to receive the second digital output, operate at the predetermined sample rate, and generate a third audio signal.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Numerous specific details may be set forth below to provide a thorough understanding of concepts underlying the described implementations. It may be apparent, however, to one skilled in the art that the described implementations may be practiced without some or all of these specific details. In other instances, some process steps have not been described in detail in order to avoid unnecessarily obscuring the underlying concept.

According to various implementations disclosed herein, methods, systems, and apparatuses for synchronous sampling of periodic and quasi-periodic analog signals in the field of electronic music effects are provided. A musical signal can be considered quasi-periodic, and the period of such signal may cover a wide range (e.g., almost eight octaves for a piano keyboard). Furthermore, for most musical passages, the period of the musical signal is constantly time-varying. The wide range and the time-varying nature of the musical signal period create specific challenges for synchronous sampling methods. For example, one of the challenges is that the frequency can change quickly due to the music signal being dynamic and covering a multi-decade range. The methods, systems, and apparatuses disclosed herein solve these challenges.

Figure 1:
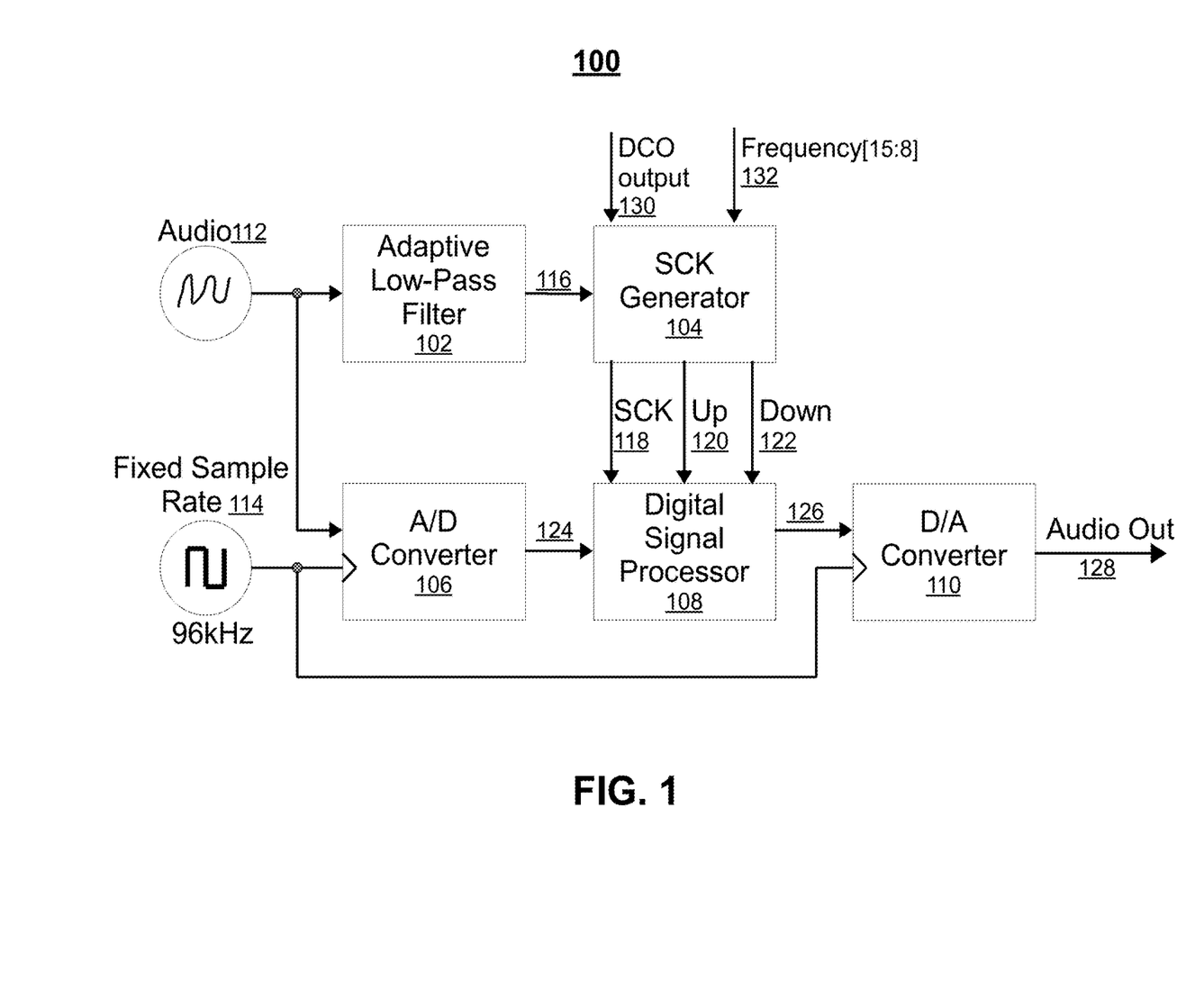
FIG. 1 is a block diagram of a synchronous sampling music synthesizer, in an accordance with a described implementation.

Referring to FIG. 1, a block diagram of a music synthesizer 100 utilizing synchronous clock sampling is illustrated. The music synthesizer 100 includes an adaptive low-pass filter 102, a synchronous sample clock ("SCK") generator 104, an analog-to-digital ("A/D") converter 106, a digital signal processor ("DSP") 108, and a digital-to-analog ("D/A") converter 110. Although not shown in FIG. 1, the music synthesizer can include other additional components.

The synthesizer 100 receives an audio signal 112. In some implementations, the audio signal 112 is a musical signal. As shown, the audio signal 112 goes through two paths, with the first path going through the adaptive low-pass filter 102 and the SCK generator 104, and the second path going through the A/D converter 106.

In the first path, the audio signal 112 is received by the adaptive low-pass filter 102. The adaptive low-pass filter 102 selects only the fundamental frequency in the audio signal 112. The adaptive low-pass filter 102 removes higher frequencies present in the audio signal 112, so that a zero-crossing detector (not shown in FIG. 1) can convert the resulting low-pass filtered signal into a reference clock signal 116 for the SCK generator 104. The adaptive low-pass filter 102 may remove frequencies that are higher than a predetermined cutoff frequency.

Figure 2:
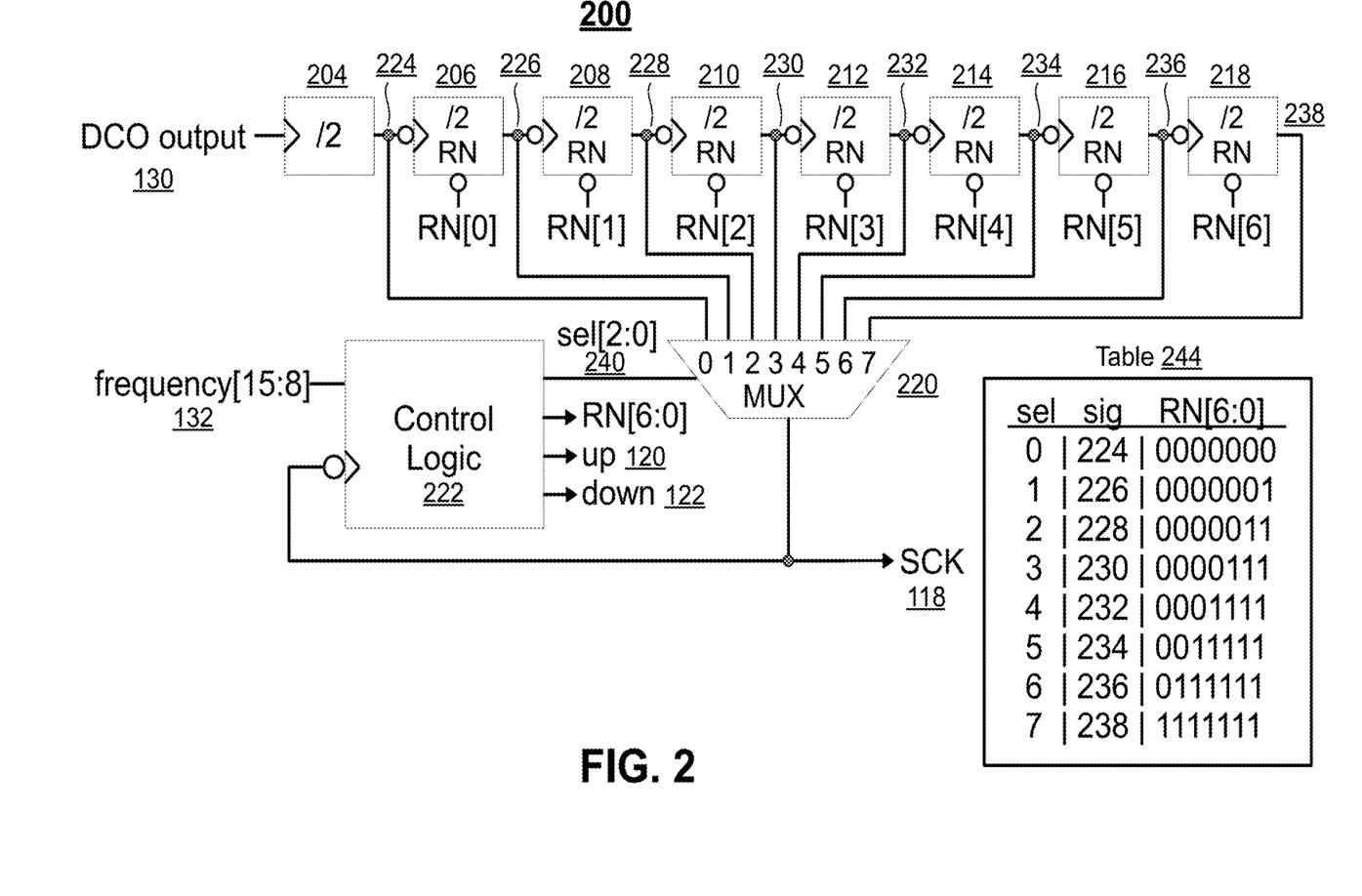
FIG. 2 is a diagram of a synchronous sample clock generator, in an accordance with a described implementation.

The SCK generator 104 receives a DCO output 130 and a frequency 132, and generates a synchronous sample clock signal 118, as well as the associated "up" signal 120 and "down" signal 122, which are utilized by the DSP 108 to perform operations on the audio signal 112. FIG. 2 illustrates a block diagram of the SCK generator 104. The DCO output 130 may be generated by an oscillator (not shown in FIG. 1.), while the frequency 132 may be generated by a frequency generation engine (now shown in FIG. 1). The signal 116 may be utilized as a reference frequency by the frequency generation engine to determine the frequency 132.

The second path takes the audio signal 112 into the A/D converter 106 operating at a fixed sample rate 114. The A/D converter 106 produces a digital data output 124 using the audio signal 112 and the fixed sample rate 114. The digital data output 124 is a digital version of the analog audio signal 112. Although the fixed sample rate 114 is set to 96 kHz, the fixed sample rate 114 can have an audio sample rate value other than 96 kHz. For example, the fixed sample rate 114 may be set to 44.1 kHz, 48 kHz, 88.2 kHz, or another value.

The A/D converter 106 can be implemented as an integrated circuit. The A/D converter 106 can be implemented as a flash A/D converter, a successive-approximation A/D converter, a Wilkinson A/D converter, an integrating A/D converter, a pipeline A/D converter, a ramp-compare A/D converter, a sigma-delta A/D converter, or another type of A/D converter.

Figure 4:
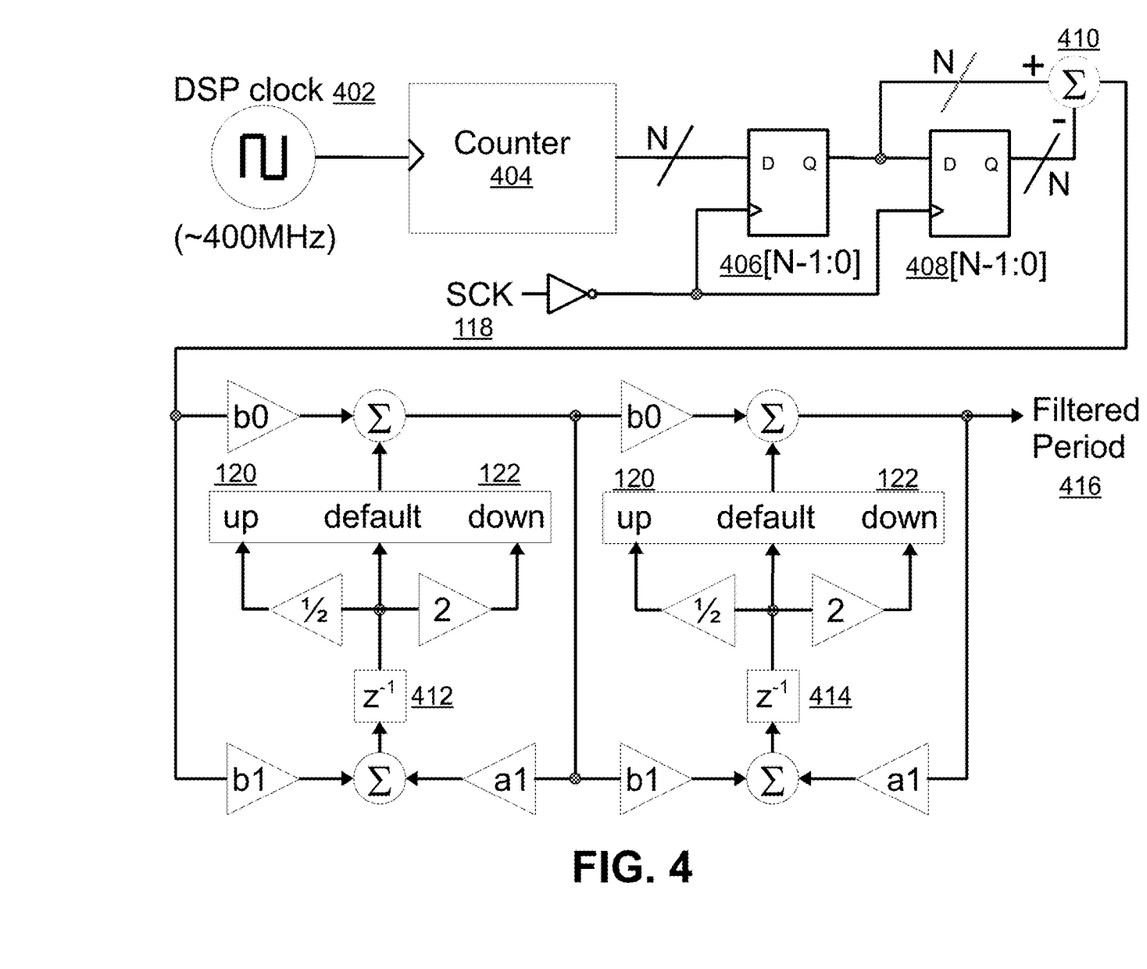
FIG. 4 is a diagram of a digital signal processor, in an accordance with a described implementation.

The DSP 108 receives the digital data output 124 from the A/D converter 106, and the SCK signal 118 as well as the signals 120 and 122 from the SCK generator 104. The DSP 108 resamples the digital data signal 124 at the variable SCK rate 118. The DSP 108 may perform operations on the re-sampled signal to the SCK rate 118, and then re-sample the (possibly modified) audio signal 112 back again to the fixed rate 114 (e.g., 96 kHz). FIG. 4 provides a diagram of the DSP 108.

The resulting digital signal 126 is then converted back to analog by the D/A converter 110. As shown, the D/A converter 110 operates at the fixed sample rate 114 (e.g., 96 kHz). After the D/A converter 110 converts the digital signal 126 into an audio signal 128, the audio signal 128 can be played back live or recorded. The D/A converter 110 can be implemented as an integrated circuit. The D/A converter 110 can be implemented as a pulse-width modulator, R-2R ladder D/A, Cyclic D/A, thermometer-coded D/A, binary-weighted D/A, a hybrid D/A, or another type of D/A converter.

FIG. 2 illustrates a circuit 200 of the SCK generator 104. As illustrated, an adaptive divide-by-power-of-2 technique is utilized to keep the SCK frequency 118 within a particular frequency range (e.g., 100 kHz-200 kHz). The up signal 120 and the down signal 122 indicate when the SCK frequency 118 is doubled or halved. The DSP 108 shown in FIG. 4 then filters the sequence of SCK periods and uses the up signal 120 and the down signal 122 to avoid glitches in the filter output 416.

The SCK generator 104 receives a DCO output 130, and then generates the SCK signal 118, and the signals 120 and 122. In various embodiments, to generate the SCK signal 118, the DCO output 130 may be divided by a power of 2 that is necessary to generate the SCK signal 118 in a certain range. In some implementations, the SCK clock 118 may be within a tighter range (e.g., the SCK clock 118 varies in 2 to 1 range instead of 256 to 1 range of the DCO output 130) than the DCO output 130 range. For example, the range of the SCK signal 118 may be 100 kHz to 200 kHz. This process is controlled by a multiplexer 220, which selects one of the divider outputs, and the selected signal changes on falling edges of the SCK clock 118.

As shown, the circuit 200 of the SCK generator 104 includes eight divide-by-2 blocks 204-418, control logic 222, and the 8-to-1 multiplexer 220. In other embodiments, the circuit 200 can include another number of divider blocks, additional multiplexer(s), and/or other components.

The DCO output 130 is initially received by the divide-by-2 block 204. The DCO output 130 may vary over a multi-decade range (e.g., 256 to 1 range from maximum to minimum frequency). The DCO signal 130 is a clock oscillating at a predetermined number of times the fundamental frequency of the audio signal 112. In one implementation, the DCO output 130 is a clock oscillating at 8,192 times the signal 116. The predetermined number may be set to a value different from 8,192.

In one implementation, the DCO output 130 may be generated by an oscillator (not shown in FIG. 1) using the signal 116. In this implementation, the oscillator receives the signal 116 and produces the DCO output 130 based on the signal 116. In one embodiment, the oscillator may be a component of the SCK generator 104. In another embodiment, the oscillator may be a component in FIG. 1 that receives the signal 116 from the adaptive low-pass filter 102 and generates the DCO output 130, which is then sent to the SCK generator 104. A detailed description of an example embodiment of an oscillator generating the DCO output 130 is described in co-pending U.S. patent application Ser. No. 14/864,886, entitled FAST-LOCKING FREQUENCY SYNTHESIZER, filed Sep. 25, 2015, which is incorporated herein in its entirety and for all purposes.

The divide-by-2 block 204 divides the DCO output 130 by 2, generating an output 224, which is passed as input to the divide-by-2 block 206, and to the multiplexer 220. In turn, the divide-by-2 block 206 divides the output 224 of the block 204 by 2, generating an output 226, which is passed to the divide-by-2 block 208 and to the multiplexer 220.

The divide-by-2 block 208 receives the output 226 from the divide-by-2 block 206, and divides the output 226 by 2, producing an output 228, which is passed to the divide-by-2 block 210, and to the multiplexer 220. The divide-by-2 block 210 receives the output 228 from the divide-by-2 block 208, and divides the output 228 by 2, producing an output 230, which is passed to the divide-by-2 block 212, and to the multiplexer 220.

The divide-by-2 block 212 receives the output 230 from the divide-by-2 block 210, and divides the output 230 by 2, producing an output 232, which is passed to the divide-by-2 block 214, and to the multiplexer 220. The divide-by-2 block 214 receives the output 232 from the divide-by-2 block 212, and divides the output 232 by 2, producing an output 234, which is passed to the divide-by-2 block 216 and to the multiplexer 220.

The divide-by-2 block 216 receives the output 234 from the divide-by-2 block 214, and divides the output 234 by 2, producing an output 236, which is passed to the divide-by-2 block 218 and to the multiplexer 220. The divide-by-2 block 218 receives the output 236 from the divide-by-2 block 216, and divides the output 236 by 2, producing an output 238, which is passed to the multiplexer 220.

As a result, the multiplexer 220 receives eight inputs from the divide-by-2 blocks 204-218 (i.e., the outputs 224, 226, 228, 230, 232, 234, 236, and 238). The output of the multiplexer 220 is the SCK signal 118. As shown, the SCK signal 118 itself may be used to trigger state changes in the control logic 222 to eliminate glitches in the SCK signal 118.

As further shown in FIG. 2, the multiplexer 220 has a selector input 240. The selector input 240 includes three selector pins. In other embodiments, the multiplexer 220 may have another number of selector pins depending on the number of inputs into the multiplexer 220. FIG. 2 further illustrates a table 244 that is used by the multiplexer 220 to select its output. In particular, the table 244 illustrates what input signal the multiplexer 220 selects as well as which divide-by-2 blocks are held in reset based on the value of the selector input 240.

The control logic 222 receives a frequency code 132. The selection of the proper divide-by-2 output may be entirely (or in part) based on the received frequency code 132. In some embodiments, the control logic 220 may select the divider output of the multiplexer 220 using the integer portion of the frequency code 132. In some embodiments, the top three most significant bits may control which divide-by-2 setting is used. In some embodiments, some digital hysteresis may be added, so that the octave setting does not oscillate when the input frequency is close to the boundary between two octave settings. In one implementation, the frequency code 132 is generated by a digital frequency iteration engine described in co-pending U.S. patent application Ser. No. 14/864,886, entitled FAST-LOCKING FREQUENCY SYNTHESIZER, filed Sep. 25, 2015, which is incorporated herein in its entirety and for all purposes.

The control logic 222 generates two signals 120 and 122 (shown as "up" and "down" signals in FIG. 2), which may interface with the DSP 108 thereby informing the DSP 108 when the divide ratio is changing by a factor of two. The "up" signal 120 may be driven by a pulse when the divide ratio is decreasing by a factor of two (and hence the SCK 118 frequency is increasing by a factor of two), while the "down" signal 122 may be driven by a pulse when the divide ratio is increasing by a factor of two. The divide ratio may only be permitted to increment or decrement by one value on each cycle. If a larger frequency step is made, the divide ratio would be adjusted by +1 or −1 on successive SCK cycles as many times as required until the SCK frequency falls within the target range of 100 kHz-200 kHz. This restriction ensures that the single-bit 'up' and 'down' pulses are understood with no ambiguity.

Figure 3:
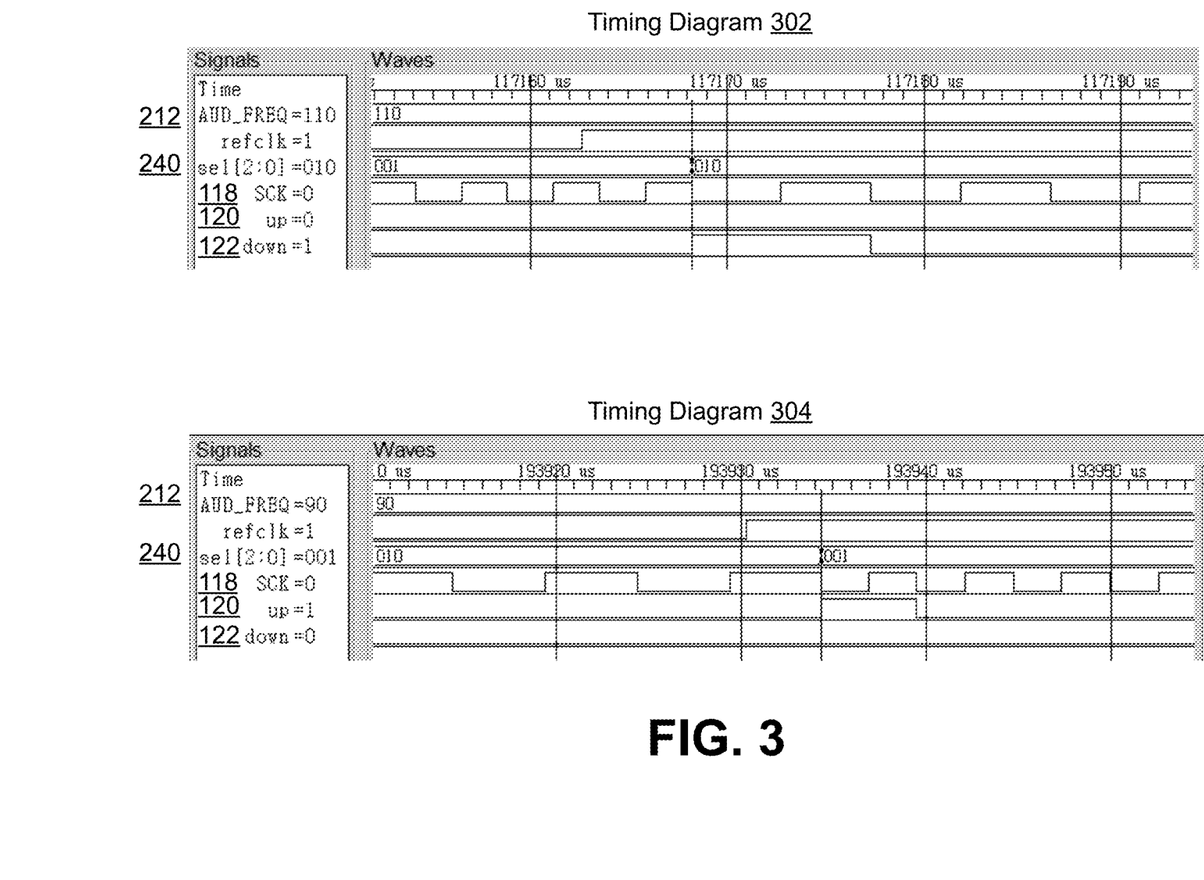
FIG. 3 illustrates timing diagrams, in an accordance with a described implementation.

FIG. 3 provides timing diagrams 302 and 304 illustrating the audio signal 112, the selector input 240, the SCK signal 118, the "up" signal 120, and the "down" signal 122. In particular, the timing diagram 302 shows what happens when the frequency of the audio signal 112 changes from 90 Hz to 110 Hz. In some embodiments, in the beginning, the selector input 240 may be set to 1. In other embodiments, the selector input 240 is initially set to another value. As a result, the divide-by-4 output 226 is selected, so that the SCK signal 118 is running at 184.32 kHz (as a result of ((90 Hz)*8,192)/4=184.32 kHz).

In this embodiment, the audio signal 112 is multiplied by 8,192 because the DCO output 130 runs at 8,192 times faster than the audio signal 112. In other embodiments, a different value other than 8,192 may be utilized. Although a value of 8,192 is used to multiply the audio frequency, any other value can be used (such value may be predetermined or fixed).

When the frequency of the audio signal 112 increases, the frequency of the SCK signal 118 would ordinarily change. For example, when the frequency of the audio signal 112 increases from 90 Hz to 110 Hz, the frequency of the SCK signal 118 would change from 184.32 kHz to 225.28 kHz (as a result of ((110 Hz)*8,192)/4=225.28 kHz).

The resulting frequency of the SCK signal 118 having a value of 225.28 kHz may be outside of the allowed signal range of the SCK signal 118. In one implementation, the allowed signal rage of the SCK signal 118 is set to 100 kHz to 200 kHz. In other implementations, the allowed signal range for the SCK signal 118 may have other values.

To keep the SCK signal 118 clock within the allowed range, the value of the selector input 240 may be updated to 2 on the falling edge of SCK signal 118 clock. As a result, the multiplexer 220 may engage and select the next divide-by-2 output 228 to bring the SCK 118 frequency down to 112.64 kHz (as a result of 225.28 kHz/2=112.64 kHz). When this happens, a single pulse on the "down" signal 122 may be generated for one full cycle of the first "slower" cycle of the SCK signal 118. The control logic 222 may be clocked by the negative edges of SCK signal 118 clock, so that the state of the multiplexer 220 (and consequently, the divider output selected for SCK 118) is guaranteed to change only when the SCK signal 118 is low.

In addition to the 8-to-1 multiplexer 220, which selects the appropriate divider output based on the selector input 240, all but the first divider 204 can be held in reset if its output is not actually needed. This may be necessary in order to guarantee that when the divider setting switches from faster to a slower setting (i.e., when the "down" pulse 122 is activated), the slower divider output will start out in the "low" state.

The timing diagram 304 illustrates what happens when the frequency of the audio signal 112 changes back from 110

Hz to 90 Hz. At this time, the divider 208 is still set, so that the SCK signal 118 is (8,192/8)*(frequency of the signal 112), so the frequency would ordinarily change from 112.64 kHz (as a result of 1,024*110 Hz) to 92.16 kHz (as a result of 1,024*90 Hz). However, the new frequency of 92.16 kHz is outside the allowed SCK range of 100 kHz to 200 kHz. In this case, the circuit 200 reverts to the original selector input 240 and divider setting, and the frequency of the SCK signal 118 becomes 2,048*90 Hz=184.32 kHz. A single pulse on the "up" signal 120 may be generated for one full cycle of the "faster" cycle of the SCK signal 118.

The SCK signal 118, and the up and down signals 120 and 122 are sent to the DSP 108, which in turn generates a clean sample clock for resampling the original audio signal 112 to the "synchronous" SCK rate. FIG. 4 illustrates generation of the clean sample timing by the DSP 108.

As shown in FIG. 4, the DSP 108 filters the sequence of SCK periods and uses the signals 120 and 122 to avoid glitches in the filter output. The DSP 108 utilizes a filtering algorithm using the signals 120 and 122.

The DSP 108 includes a counter 404, a bank of flip-flops 406, a bank of flip-flops 408, a subtractor block 410, and a digital filter having two identical first-order filter sections. The counter 404 is a cycle counter that counts the number of high-frequency DSP clock cycles, which have elapsed since power-up. A DSP clock frequency 402 of about 400 MHz is assumed. In other embodiments, the DSP clock frequency 402 can be set to another value. It may be advantageous to set the DSP clock frequency 402 to a high value.

On falling edges of the SCK signal 118, an interrupt may be generated, which records the current state of the DSP cycle counter 404. This is represented in FIG. 4 by the bank of N flip-flops 406 [N−1:0]. In other implementations, this may be implemented as a DSP register that can be written and read.

When the interrupt occurs, the old counter value is stored in the bank of flip-flops 408 ([N−1:0]). In other implementations, instead of the bank of flip-flops 408, another DSP register may be utilized that can be written and read. The subtractor block 410 calculates the difference between the current cycle count value and the old cycle count value, which provides a representation of the SCK period 418 in a number of DSP clock cycles.

The rest of the diagram in FIG. 4 utilizes a signal flow diagram, which describes a digital filter. In particular, the signal flow diagram describes a second-order low-pass filter. The embodiment shown in FIG. 4 uses a cascade of two identical first-order filter sections.

In contrast to the digital filter shown in FIG. 4, if the calculated SCK periods 418 were sent to a standard low-pass filter, when the filter period jumps by a factor of ½ or 2, the filter would have to process that jump and a large error would result in the filter output until the filter settles, with the settling time of a filter being dependent on the low-pass cutoff frequency (the lower the cutoff frequency the more noise it will filter but the longer time it takes to settle). In FIG. 4, the halving/doubling logic controlled by the "up" and "down" signals 120 and 122 forces the digital filter to adapt immediately to abrupt changes in the SCK period. As a result, waiting for the filter to settle is avoided.

A block 412 and a block 414 each represent a single-cycle delay. In this case, the cycle in question is the SCK clock 118 and the state of this digital filter is updated on the negative edges of the SCK clock 118 (e.g., just as with the cycle count sampling and difference operations). Although FIG. 4 illustrates one possible implementation of the low-pass filter, the low-pass filter may be implemented in another way.

In one implementation, the coefficients may be set as follows: b0=b1=1/128 and a1=63/64. This gives each first-order filter a −3 dB frequency of about 250 Hz when the frequency of the SCK signal 118 is 100 kHz. The cutoff frequency may scale with the sample rate, and would rise to 500 Hz when the frequency of the SCK signal 118 is 200 kHz. In other implementations, the coefficients can be assigned other values.

The selection of the cutoff frequency for filtering the SCK periods may involve a trade-off between frequency tracking speed and SCK jitter filtering. The DCO code may be modulated with a second-order sigma-delta modulator, resulting in the period changing from one cycle to the next. An additional source of error in the periods measured inside the DSP 108 may come from time quantization of the DSP clock cycles. Because it may not be possible to measure time with better granularity than one DSP clock period, increasing the DSP clock frequency may be desired.

The multiplexers based on the up and down signals 120 and 122 are embedded into the low-pass filter flow diagram, allowing the low-pass filter to make large step increments when the period changes by a factor of two in either direction by bypassing its regular transient response. If the "up" signal 120 equals 1 when the negative edge of the SCK signal 118 occurs, the outputs of the two delay cells 412 and 414 may be divided by 2, before being applied to the summing inputs. In this case, it is expected that the current period will be one half the previous period, as shown in the timing diagram 304 in FIG. 3.

Conversely, if the "down" signal 122 equals 1 when the negative edge of the SCK signal 118 occurs, the outputs of the two delay cells 412 and 414 may be multiplied by 2 before being applied to the summing inputs. In this case, it is expected that the current period will be twice the previous period, as shown in the timing diagram 302 in FIG. 3. When neither "up" nor "down" pulse equals 1, the default may be to take the delay cell 412 or 414 outputs without modification into the summing inputs.

The second-order sigma-delta modulator and the second-order low-pass filter can be shown to result in sufficiently reduced jitter in the resulting filtered period 416 that comes out of the filter block. Once this filtered period 416 is obtained, the DSP 108 may generate time stamps and re-sample the original audio to these filtered time stamps. The DSP 108 may then perform sample rate conversion.

Once the musical input signal has been re-sampled to the SCK clock domain, the DSP 108 can perform various operations. In some embodiments, one of the operations performed by the DSP 108 may be computation of the Fourier Transform components of the audio (since the SCK signal 118 frequency may be exactly a power of two times the fundamental frequency of the audio signal 112). The Fourier Transform components calculated by the DSP 108 with a synchronous sampling clock may result in superior-sounding audio effects than competing technologies that perform all processing of audio signals in a standard fixed-sample-rate domain.

Once the Fourier components of an audio signal can be isolated in this way, their amplitudes can be adjusted individually, and, then, those components can be added back together. The audio signal can be re-sampled back to the fixed audio sample rate 114 (e.g., 96 kHz as shown in FIG. 1). This results in a morphing of the spectrum of the original audio signal 112, where certain harmonics can be amplified and others attenuated. In some embodiments, the effect would be to morph certain instrumental voices to sound like other instruments. These effects may be achieved in real-time (or in near real-time) with no perceptible latency, and may be suitable for use in live performance.

Various other operations can be convenient in the synchronously-sampled SCK clock domain. Some of the other operations include the DSP performing pitch-shifting on the individual Fourier components before summing them back together, resulting in a very smooth, natural-sounding pitch shift. As existing pitch-shift effects may not sound natural, this could provide an advantage over current technologies. Additionally, the user could modify a human voice to sound different (e.g., in terms of voice quality and vocal range).

Figure 5:
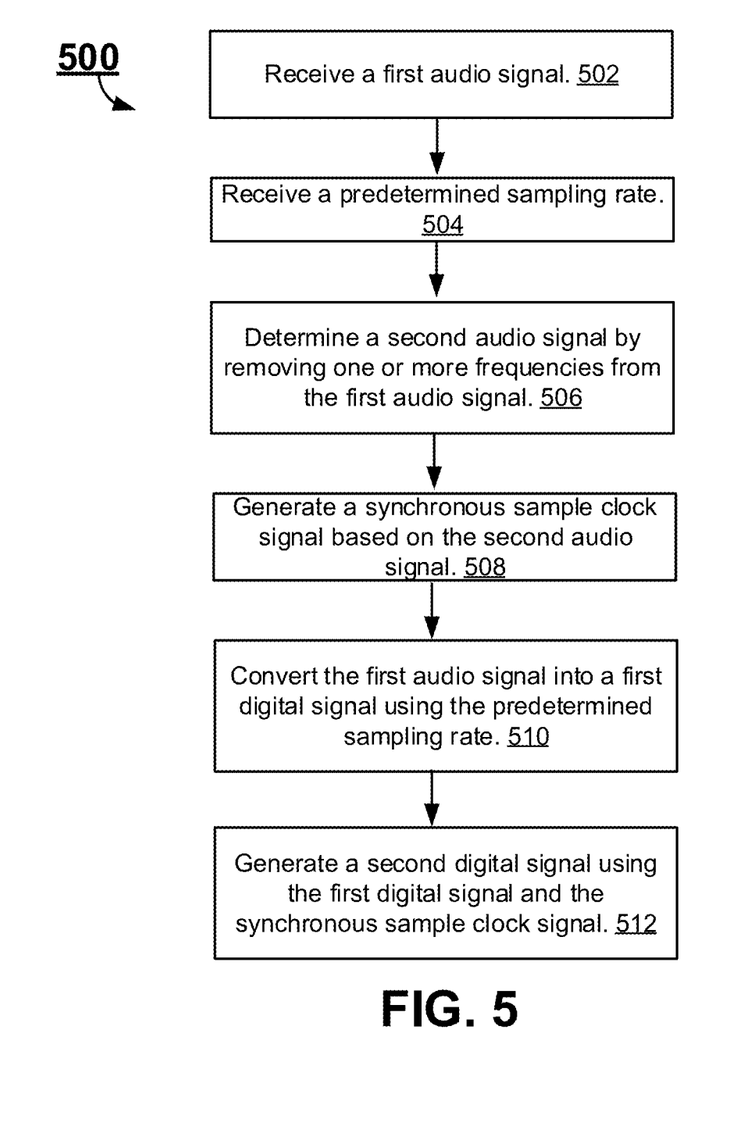
FIG. 5 is a flow diagram of a process for determining an audio signal, in an accordance with a described implementation.

FIG. 5 is a flow diagram of a process 500 for synchronous sampling of an analog signal. The process 500 can be implemented by the music synthesizer 100. At the block 502, a first audio signal is received. The audio signal may be a musical signal produced by the music synthesizer 100. The audio signal is shown in FIG. 1 as the audio signal 112.

A predetermined sampling rate is received (block 504). The predetermined sampling rate may have a value of 96 kHz as shown in FIG. 1. In other embodiments, the predetermined sampling rate may have another value. A second audio signal is determined (block 506) by removing one or more frequencies from the first audio signal. The determination of the second audio signal may be performed by an adaptive low-pass filter (e.g., the adaptive low-pass filter 102). A synchronous sample clock signal is generated (block 508) based on the second audio signal. In some embodiments, the SCK generator 104 generates the SCK signal (e.g., the SCK signal 118). The SCK generator 104 may also generate the up signal 120 and the down signal 122 as illustrated in FIG. 2.

At block 510, the first audio signal is converted into a first digital signal using the predetermined sampling rate. This step may be performed by an A/D converter such as the A/D converter 106.

A second digital signal is generated (block 512) using the first digital signal and the synchronous sample clock signal. The second digital signal may be generated by the DSP 108 by performing sample-rate conversion to convert from the fixed sample rate to the time-varying rate represented by the SCK signal. This signal may be optionally processed by the DSP in the time-varying SCK sample rate domain. Then, the second digital signal may be converted back into a second audio signal by performing sample-rate conversion to convert back from the time-varying SCK domain to the fixed-rate domain appropriate for clocking a D/A converter.

Those skilled in the art would appreciate that the circuits described herein may be realized using a variety of transistor types. Various transistor types can be used including bipolar junction transistors, junction field effect transistor, etc. The circuits described herein may be fabricated with various IC process technologies (e.g., CMOS, silicon germanium, bipolar junction transistor, bipolar-CMOS, etc.).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein. For example, many circuits are possible for implementing the adaptive low-pass filter 102, the SCK generator 104, the A/D converter 106, the DSP 108, and the D/A converter 110. These systems may be implemented with analog electronics, digital logic, software executing on a processor, or any combination of these or other techniques.

What is claimed is:

1. A method for synchronous sampling, the method comprising: receiving a first audio signal of varying frequency; receiving a predetermined fixed sampling rate; determining a second audio signal by removing one or more frequencies from the first audio signal; generating a synchronous sample clock signal based on the second audio signal; converting the first audio signal into a first digital signal using the predetermined fixed sampling rate; and generating a second digital signal using the first digital signal and the synchronous sample clock signal.

2. The method of claim 1, further comprising converting the second digital signal into a third audio signal using the predetermined fixed sampling rate.

3. The method of claim 1, wherein the predetermined fixed sampling rate is 96 kHz.

4. The method of claim 1, further comprising generating an up signal and a down signal.

5. The method of claim 1, wherein generating the second digital signal further comprises performing sample-rate conversion to convert the first digital signal from the predetermined fixed sampling rate to time-varying rate represented by the synchronous sample clock signal.

6. The method of claim 5, wherein generating the second digital signal further comprising processing the second digital signal in a time-varying synchronous sample clock rate domain.

7. A music synthesizer providing synchronous clock sampling, comprising:
   an adaptive low-pass filter configured to receive a first audio signal of varying frequency and generate a second audio signal using the first audio signal;
   a synchronous sample clock generator configured to generate a synchronous sample clock signal based on the second audio signal;
   an analog-to-digital converter configured to operate at a predetermined fixed sample rate and receive the first audio signal, and generate a first digital output;
   a digital signal processor configured to receive the first digital output and the synchronous sample clock signal, and generate a second digital output; and
   a digital-to-analog converter configured to receive the second digital output, operate at the predetermined sample rate, and generate a third audio signal.

8. The music synthesizer of claim 7, wherein the first audio signal is a music signal.

9. The music synthesizer of claim 8, wherein the adaptive low-pass filter is configured to remove a plurality of frequencies from the first audio signal.

10. The music synthesizer of claim 7, wherein the synchronous sample clock generator further comprises: a plurality of divide by two components, control logic, and a multiplexer, wherein the multiplexer receives outputs of the plurality of the divide by two components, and the synchronous sample clock signal is an output of the multiplexer.

11. The music synthesizer of claim 10, wherein the control logic provides input selection to the multiplexer.

12. The music synthesizer of claim 11, wherein the control logic is clocked by negative edges of the synchronous sample clock signal.

13. The music synthesizer of claim 12, wherein the control logic determines the input selection based on a predetermined frequency range for the synchronous sample clock signal.

14. The music synthesizer of claim 7, wherein the digital signal processor further comprising a cycle counter, one or more banks of flip-flops, and a digital circuit of a second-order low-pass digital filter.

15. The music synthesizer of claim 14, wherein the digital circuit of the second-order low-pass digital filter includes a first-order filter section and a second-order filter section.

16. The music synthesizer of claim 15, wherein the first-order filter section and the second-order filter section are identical.

17. The music synthesizer of claim 7, wherein the digital signal processor is configured to perform sample-rate conversion of the first digital output to convert from the predetermined fixed sample rate to time-varying rate represented by the synchronous sample clock signal.

18. A music synthesizer providing synchronous clock sampling, comprising:
- an adaptive low-pass filter configured to receive a first audio signal of varying frequency and generate a second audio signal using the first audio signal, wherein the first audio signal is a musical signal;
- a synchronous sample clock generator configured to generate a synchronous sample clock signal based on the second audio signal, the synchronous sample clock generator comprising: a plurality of divide by two components, control logic, and a multiplexer;
- an analog-to-digital converter configured to operate at a predetermined fixed sample rate and receive the first audio signal, and generate a first digital output;
- a digital signal processor configured to receive the first digital output and the synchronous sample clock signal, and generate a second digital data output, the digital signal processor comprising a cycle counter, a first bank of flip-flops, a second bank of flip-flops, and a digital filter; and
- a digital-to-analog converter configured to receive the second digital data output, operate at the predetermined fixed sample rate, and generate a third audio signal.

19. The music synthesizer of claim 18, wherein the digital filter is a second-order low-pass digital filter, the digital filter comprising a first-order filter section and a second-order filter section.

20. The music synthesizer of claim 18, wherein the multiplexer receives outputs of the plurality of the divide by two components, and the synchronous sample clock signal is an output of the multiplexer.

\* \* \* \* \*